United States Patent
Nojima

(10) Patent No.: US 7,388,340 B2
(45) Date of Patent: Jun. 17, 2008

(54) DRIVING DEVICE OF MOTOR

(75) Inventor: Kenji Nojima, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/523,562

(22) Filed: Sep. 20, 2006

(65) Prior Publication Data

US 2007/0063667 A1    Mar. 22, 2007

(30) Foreign Application Priority Data

Sep. 20, 2005 (JP) ............................ 2005-271770

(51) Int. Cl.
*H02P 21/04* (2006.01)

(52) U.S. Cl. ............................ 318/400.02; 318/400.32; 318/715

(58) Field of Classification Search ................ 318/138, 318/254, 437, 439, 400.01, 400.02, 400.32, 318/700, 712–715
See application file for complete search history.

(56) References Cited

U.S. PATENT DOCUMENTS

| | | | |
|---|---|---|---|
| 5,656,911 A * | 8/1997 | Nakayama et al. | 318/718 |
| 6,008,614 A * | 12/1999 | Imai | 318/700 |
| 6,850,031 B2 * | 2/2005 | Nakata et al. | 318/801 |
| 6,864,662 B2 * | 3/2005 | Recker | 318/807 |
| 7,176,644 B2 * | 2/2007 | Ueda et al. | 318/138 |
| 2004/0217729 A1 * | 11/2004 | Recker | 318/807 |
| 2007/0040524 A1 * | 2/2007 | Sarlioglu et al. | 318/438 |

FOREIGN PATENT DOCUMENTS

JP     2004-48886 A     2/2004

* cited by examiner

*Primary Examiner*—Bentsu Ro
(74) *Attorney, Agent, or Firm*—McDermott Will & Emery LLP

(57) ABSTRACT

An object is to provide a driving device capable of detecting a current of a motor without any trouble even in a low rotation speed/low load state to continue a sensor-less vector control, in a case where the motor is driven by the sensor-less vector control, and the driving device comprises: a main inverter circuit for applying a pseudo alternating voltage to a permanent magnet type motor M to drive the motor; a current sensor 6 which detects the current flowing through the motor; and a control circuit which controls the main inverter circuit. Based on an output of the current sensor, the control circuit separates the current flowing through the motor into a torque current component and a field current component to control commutation of the main inverter circuit by the sensor-less vector control. In a case where the motor is operated in a predetermined low rotation speed region and/or the motor is in a predetermined low load state, the field current component is passed in such a direction as to weaken a magnetic flux of a permanent magnet.

2 Claims, 2 Drawing Sheets

DRIVING DEVICE OF MOTOR

BACKGROUND OF THE INVENTION

The present invention relates to a driving device which controls a permanent magnet type motor by a sensor-less vector system without using any magnetic pole position sensor.

Heretofore, in a case where a permanent magnet type synchronous motor is controlled without using any magnetic pole position sensor, a vector control is usually used. This vector control is a technique in which a current flowing through the motor is separated into a torque current component and a field current component, and an optimum current value is calculated in accordance with a position of a rotor, so that an efficient control having little torque fluctuation is possible as compared with a rectangular-wave inverter.

To perform such a control, a magnetic pole position of the rotor needs to be grasped, but in a sensor-less vector control for a high speed in which any magnetic pole position sensor is not used, instead of the magnetic pole position sensor, a value of the current flowing through the motor is utilized to estimate the magnetic pole position. To grasp the value of the current flowing through this motor, the current flowing through the motor is detected using a current detector such as a current transformer or a resistance, and the detected current is separated into a field current component Id and a torque current component Iq to estimate the magnetic pole position.

In an actual vector control, with respect to a d-q rotation coordinate system in which the magnetic pole position of the rotor of the motor is a rotary position at a real angle $\theta d$, a dc-qc rotation coordinate system is supposed in which an estimated angle $\theta dc$ is obtained in the control system. An axial error $\Delta\theta$ between the coordinate systems is estimated and calculated. So as to set this axial error $\Delta\theta$ to zero, a voltage command value of the inverter is fed back and corrected, and this allows an actual magnetic pole position to meet a controlled magnetic pole position.

According to such a vector control, it is possible to ideally control a magnitude and a phase of the current for driving the motor by the inverter in accordance with load conditions, and it is possible to realize motor control with high torque, response, performance and precision. On the other hand, there is not any sensor-less vector control system that is usable from a starting state in which any current flowing through the motor cannot be utilized until the high speed is reached. Therefore, there is considered a method and the like in which during the starting, for example, a constant V/F control is performed. In the control, the magnetic pole position does not have to be detected. At a predetermined rotation speed, an initial magnetic pole position set beforehand is used to shift to the vector control (see, e.g., Japanese Patent Application Laid-Open No. 2004-48886).

In addition, in recent years, to realize energy saving, this type of motor has its speed steadily lowered. When the motor is operated at a low rotation speed or when the motor is in a low load state, the whole current (torque current component+field current component) flowing through the motor is reduced. Therefore, the current cannot be detected by resolution of the above-described current detector, and there has been a problem that the detector fails in detecting the magnetic pole position, and the motor runs out of step and stops.

To avoid this problem, it is considered that the resolution (current detecting level) of the current detector is raised, but a problem occurs in the detection of the current at the high speed and with the high load. It has been difficult to use the single detector from the operation at the low rotation speed and with the low load till the operation at the high rotation speed and with the high load.

SUMMARY OF THE INVENTION

The present invention has been developed in order to solve such a conventional technical problem, and an object thereof is to provide a driving device which is capable of detecting a current of a motor without any trouble even in a low rotation speed/low load state to continue a sensor-less vector control, in a case where the motor is driven by the sensor-less vector control.

A first aspect of the present invention is directed to a driving device of a motor comprising: a main inverter circuit which applies a pseudo alternating voltage to a permanent magnet type motor to drive the motor; current detecting means for detecting a current which flows through the motor; and control means for controlling the main inverter circuit, wherein the control means separates the current flowing through the motor into a torque current component and a field current component based on an output of the current detecting means to control commutation of the main inverter circuit by a sensor-less vector control, and in a case where the motor is operated in a predetermined low rotation speed region and/or the motor is brought into a predetermined low load state, the control means permits the flow of the field current component in a direction to weaken a magnetic flux of a permanent magnet.

A second aspect of the present invention is directed to the above driving device of the motor, wherein the control means changes a value of the field current component in the direction to weaken the magnetic flux of the permanent magnet in accordance with a rotation speed and/or a load state of the motor.

According to the present invention, in a case where the current flowing through the motor is separated into the torque current component and the field current component to control the commutation of the main inverter circuit by the sensor-less vector control and drive the permanent magnet type motor, the control means permits the flow of the field current component in the direction to weaken the magnetic flux of the permanent magnet, when the motor is operated in the predetermined low rotation speed region and/or the motor is brought into the predetermined low load state. Therefore, the whole current flowing through the motor increases even with the identical torque.

In consequence, even in a case where the motor is operated at the low rotation speed or the load of the motor is light, the current detecting means can detect the current flowing through the motor without any trouble, and it is possible to avoid step-out due to failure in detection of a magnetic pole position in advance. Especially, when the value of the field current component in the direction to weaken the magnetic flux of the permanent magnet is changed in accordance with the rotation speed and/or the load state of the motor as in the second aspect of the present invention, it is possible to prevent a useless current increase while securing the current value necessary and sufficient for detecting the magnetic pole position.

DETAILED DESCRIPTION OF THE PREFERRED EMBODIMENT

Next, an embodiment of the present invention will be described with reference to the drawings. In the following embodiment, a motor M is an incorporated permanent magnet type synchronous motor to drive a motor compressor (not shown) which is to be mounted on, for example, a car air conditioner and in which carbon dioxide is used as a refrigerant. The motor M is stored together with, for example, a rotary compression element in a shell of such a compressor, and is used to rotate and drive the compression element.

Figure 1:
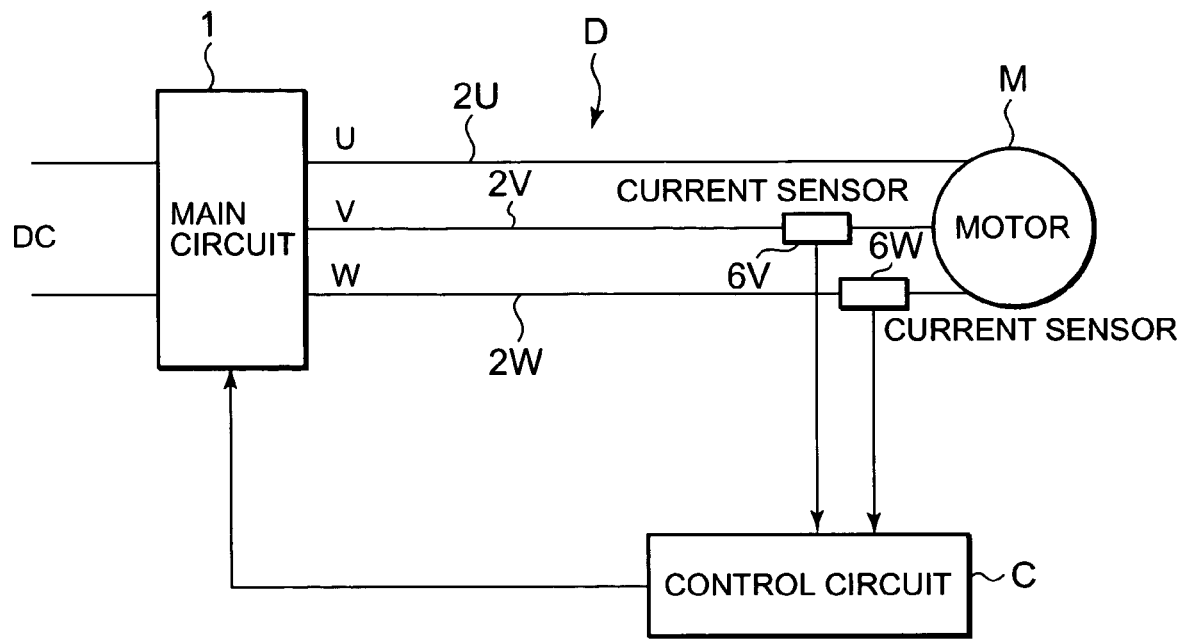
FIG. 1 is an electric circuit diagram of a driving device of a motor in one embodiment of the present invention.
Figure 2:
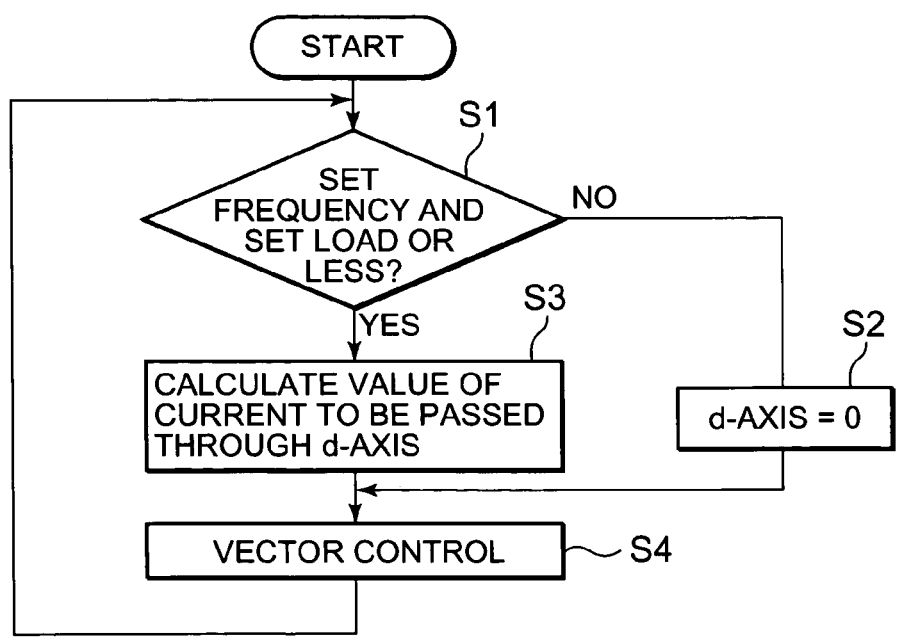
FIG. 2 is a flow chart showing a control program of a control circuit constituting the driving device of FIG.

FIG. 1 is an electric circuit diagram of a driving device D of the motor M in one embodiment to which the present invention has been applied, and FIG. 2 is a flow chart showing a control program of a control circuit C as control means constituting the driving device D. The driving device D of the present embodiment is constituted of: a main inverter circuit 1 (three-phase inverter) including six switching devices connected to a direct-current power source DC as a battery of an automobile; the control circuit (control means) C which controls commutations of the switching devices of this main inverter circuit 1 to apply a pseudo three-phase alternating voltage to the motor M and the like.

Moreover, the motor M is a synchronous motor constituted of: a stator around which three-phase coils are wound by, for example, a series system; and an incorporated permanent magnet (IPM) type rotor which rotates in this stator. The three-phase coils of U, V and W-phases of the stator are connected to secondary lines 2U, 2V and 2W of phases of the main inverter circuit 1, respectively.

Furthermore, the secondary lines 2V and 2W of the V and W-phases are provided with current sensors (current detecting means) 6V, 6W including current transformers for detecting currents which flow through the V and W-phases of the motor M, respectively, and outputs (detected current values) of the current sensors 6V, 6W are input into the control circuit C.

This control circuit C outputs a voltage command to the main inverter circuit 1, and controls the commutations of the switching devices to thereby drive the motor M by three-phase conducting under a sensor-less vector control. This three-phase conducting is a so-called 180° conducting system. Since a sine-wave voltage is applied to the three-phase coils of the stator to drive the motor, a voltage use ratio is satisfactory, and torque fluctuations are reduced. However, since a current phase is controlled to be optimum with respect to a magnetic flux of a permanent magnet of the rotating rotor, fine information on a magnetic pole position is required.

There will be described hereinafter a method of detecting the magnetic pole position during this three-phase conducting without using any sensor. With respect to a d-q rotation coordinate system (d-axis is a direction of an N-pole of the permanent magnet, q-axis is a direction (electric angle) advanced by $\pi/2$ from the d-axis) in which the magnetic pole position of the rotor of the motor M is a rotary position (actual magnetic pole position) at a real angle $\theta d$, there is considered a dc-qc rotation coordinate system in which an estimated angle $\theta dc$ is obtained in the control circuit C. Here, the angle $\theta dc$ is prepared in the control circuit C. Therefore, if an axial error $\Delta\theta$ ($\Delta\theta=\theta dc-\theta d$) can be calculated, the magnetic pole position of the rotor can be estimated.

In actual, the current flowing from the secondary lines 2V, 2W to the motor M and detected by the current sensors 6V, 6W is separated into a torque current component (detected torque current value Iq) and a field current component (detected field current value Id). Moreover, in a case where a motor model formula is solved in which voltage commands vd* and vq* to be given to the main inverter circuit 1 are represented by a winding resistance r, a d-axis inductance Ld, a q-axis inductance Lq, a power generation constant kE, a field current command Id*, a torque current command Iq*, the detected torque current value Iq, a speed command $\omega 1^*$ (input from an automobile indoor control circuit or the like based on an automobile indoor temperature, a set value of the temperature, an amount of solar radiation and the like) and the like together with the axial error $\Delta\theta$, the magnetic pole position of the rotor is estimated.

The control circuit C executes the sensor-less vector control of the motor M based on the magnetic pole position of the rotor detected by such estimation. In this case, the control circuit C separates the whole current flowing through the motor M into the torque current component (detected torque current value Iq) and a field current component (detected field current value Id), and independently controls the torque current command Iq* and the field current command Id*. Accordingly, to validate the input speed command $\omega 1^*$, the control circuit determines magnitudes and phases of the voltage commands vd*, vq* so as to establish an optimum relation between the magnetic flux and the current phase, and a relation between the torque and an operation amount is set to be linear.

Moreover, the control circuit C adjusts the phase of the current flowing through the motor M by use of the detected d-axis field current value Id. Moreover, the circuit gives the voltage commands vd*, vq* to the main inverter circuit 1, and controls the commutations of the switching devices to thereby drive the motor M at such a rotation speed as to satisfy the speed command.

Next, there will be described an operation of the control circuit C with reference to FIG. 2. In step S1, the control circuit C judges whether or not the present speed command indicates a predetermined low rotation speed (set frequency of, e.g., 30 Hz or the like) or less and/or whether or not the load of the motor M indicates a predetermined low load state (set load) or less. When the answer to this step is negative, the operation advances to step S2 to set, to zero, the field current command Id* to be passed along the d-axis, and advances to step S4.

In the step S4, the control circuit C executes the three-phase conducting of the motor M by the above-described sensor-less vector control using the magnetic pole position estimated as described above.

On the other hand, in a case where it is judged in the step S1 that the speed command indicates the predetermined low rotation speed or less and/or the load of the motor M is not more than the predetermined low load, the operation advances to step S3 to calculate a value of the current to be passed along the d-axis in a direction to weaken the magnetic flux of the permanent magnet of the rotor. During this calculation, the lower the rotation speed is and the lighter the load is, the larger a negative value of the current to be passed along the d-axis is set. Conversely, when the rotation speed is not very low and the load is not very light (the predetermined low rotation speed or less, and the low load or less are indicated in either case), the negative value of the current to be passed along the d-axis is reduced.

In the step S3, the negative value of the current to be passed along the d-axis is calculated in this manner to generate the field current command Id*, and the operation shifts to the step S4. In this case, during the sensor-less vector control of the step S4, as shown in a current vector diagram of FIG. 3 and a current waveform diagram of FIG. 4, a negative d-axis current (field current component −Id) is added. Accordingly, even with the identical torque, the whole current I flowing through the motor M is larger than the torque current component Iq.

Figure 3:
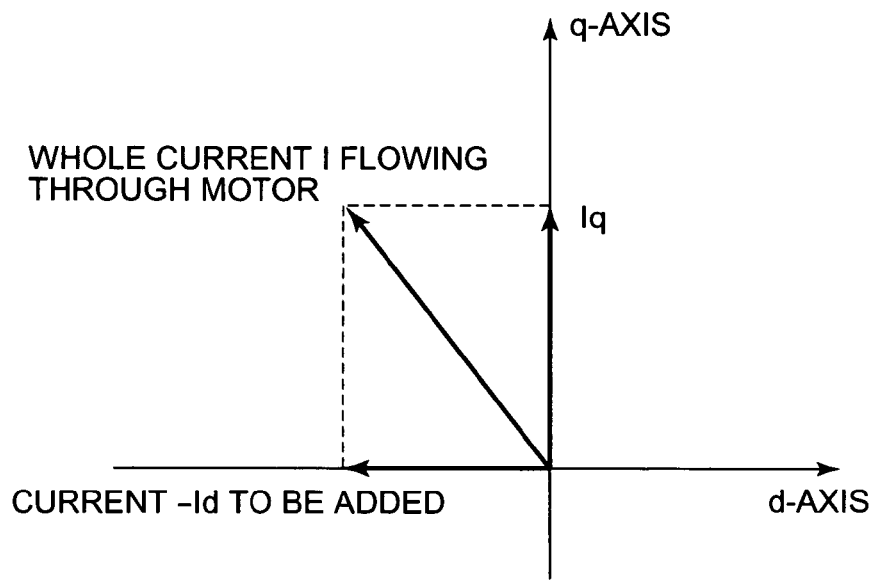
FIG. 3 is a vector diagram of a current flowing through the motor under control of the control circuit of FIG. 1.
Figure 4:
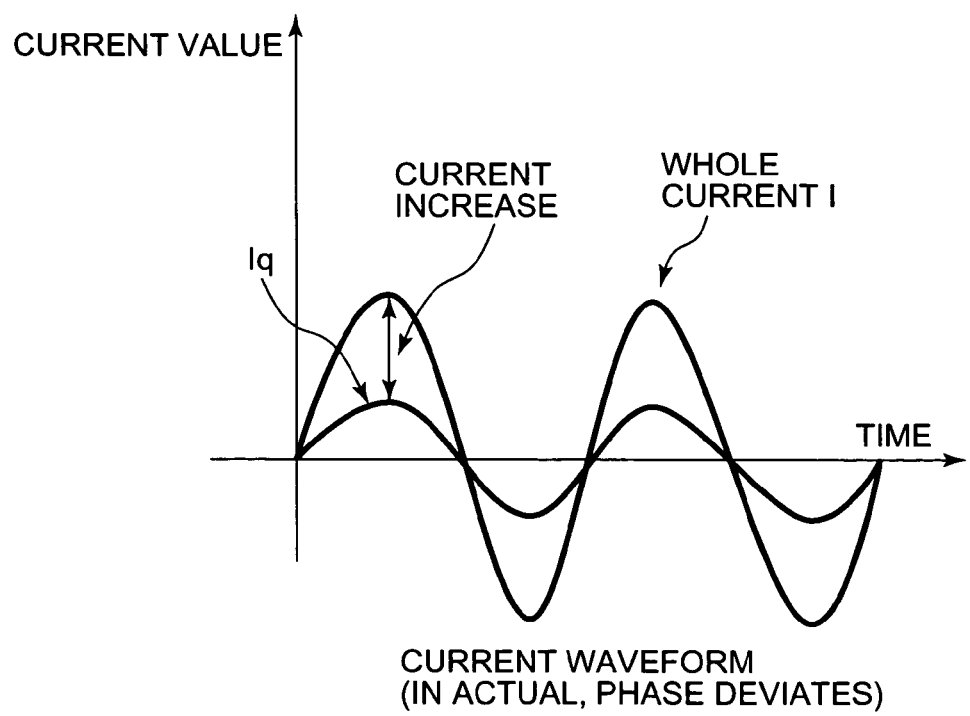
FIG. 4 is a waveform diagram of the current flowing through the motor similarly under the control of the control circuit of FIG. 1.

That is, in FIG. 3, when the field current component −Id is not passed, the current flowing through the motor M indicates a magnitude of Iq. When the component —Id is passed, however, the whole synthesized current indicates I, and becomes larger than Iq. This behavior is apparent from FIG. 4. A difference between the currents is shown as a current increase. It is to be noted that the phases of the currents actually deviate. However, for ease of seeing, FIG. 4 shows that the phases are matched.

As described above, in a case where the motor M is operated in a predetermined low rotation speed region and/or the motor M is in the predetermined low load state, the control circuit C permits the flow of the field current component (—Id) in the direction to weaken the magnetic flux of the permanent magnet. Therefore, even with the identical torque, the whole current I flowing through the motor M increases.

In consequence, even when the motor M is rotated at the low rotation speed or the load of the motor M is light, without raising resolutions of the current sensors 6V, 6W, the current sensors can detect the current I flowing through the motor M without any trouble, and it is possible to avoid, in advance, step-out due to failure in detection of the magnetic pole position of the rotor. Especially, the value of the field current component (—Id) in the direction to weaken the magnetic flux of the permanent magnet is changed in accordance with the rotation speed and/or the load state of the motor M. Therefore, while securing the current I necessary and sufficient for the detection of the magnetic pole position, a useless current increase can be prevented.

What is claimed is:

1. A driving device of a motor comprising: a main inverter circuit which applies a pseudo alternating voltage to a permanent magnet type motor to drive the motor; current detecting means for detecting a current which flows through the motor; and control means for controlling the main inverter circuit, wherein the control means separates the current flowing through the motor into a torque current component and a field current component based on an output of the current detecting means to control commutation of the main inverter circuit by a sensor-less vector control, and in a case where the motor is operated in a predetermined low rotation speed region and/or the motor is brought into a predetermined low load state, the control means permits the flow of the field current component in a direction to weaken a magnetic flux of a permanent magnet.

2. The driving device of the motor according to claim 1, wherein the control means changes a value of the field current component in the direction to weaken the magnetic flux of the permanent magnet in accordance with a rotation speed and/or a load state of the motor.

* * * * *